3,211,529
BORANE MANUFACTURE
Elmer H. Dobratz, Pittsburgh, Pa., assignor to Koppers Company, Inc., a corporation of Delaware
No Drawing. Filed Oct. 16, 1959, Ser. No. 846,811
12 Claims. (Cl. 23—204)

This invention relates to the preparation of boranes. In one specific aspect, it relates to a novel process for the simultaneous manufacture of diborane and the also useful trialkylboranes.

In recent years there has been considerable interest in improved processes for making diborane, since it is a basic raw material in the manufacture of certain liquid and solid fuels. At the present time diborane is generally prepared by the reaction of an alkali metal borohydride, such as sodium or lithium borohydride, with sulfuric acid. Unfortunately, the raw material costs for this process are quite high because of the high costs of the alkali metal borohydride and the reaction itself is somewhat difficult to carry out. Attempts to improve the reaction are described in U.S. Patent 2,880,068.

Quite surprisingly, I have discovered a novel process which makes use of less expensive starting materials and which is relatively easy to control. My process has an additional advantage in that it is capable of simultaneously producing diborane and the useful and interesting trialkylboranes. These latter compounds serve as components in fuels and as catalysts in the preparation of high polymers, e.g. high density polyethylene.

In my copending application S.N. 780,659, filed December 16, 1958, I have described and claimed a method of making trialkylboranes by adding boron trichloride to at least about a stoichiometric quantity of trialkylaluminum or alkylaluminum chloride in the presence of an anhydrous aliphatic hydrocarbon solvent. The present invention differs from that of my copending application in that it utilizes a different class of starting materials, viz: the dialkylaluminum hydrides. Boron halides other than boron trichloride are also useful in the present invention and the present invention provides as a product diborane in addition to the desirable trialkylboranes.

It is, therefore, an object of the present invention to provide an economical method for simultaneously producing diborane and trialkylboranes.

In accordance with the invention, diborane and trialkylboranes are simultaneously prepared by admixing a boron halide and at least about a stoichiometric quantity of dialkylaluminum hydride, preferably in the presence of an aliphatic hydrocarbon solvent. The reaction mixture is heated at an elevated temperature, i.e. 50–250° C. to effect completion of the reaction. Diborane and trialkylborane are recovered from the reaction mixture by distillation. As is the case in my copending application, the trialkylborane is difficult to separate completely from the aluminum halide. If desired, susbtantially halogen-free trialkylborane is recovered by washing out the residual aluminum halide with water after the diborane has been removed and subsequently recovering the trialkylborane by distillation. An alternate procedure involves adding a small amount of trialkylaluminum to the trialkylborane followed by a distillation step. Also, tertiary amines can be used as a complexing agent for the residual aluminum halide after the removal of the diborane.

The starting materials, the dialkylaluminum hydrides and boron halides, are readily available. Useful dialkylaluminum hydrides include diethylaluminum hydride, diisopropylaluminum hydride, di-n-propylaluminum hydride, diisobutylaluminum hydride, and the like. The dialkylaluminum hydrides may contain appreciable quantities of trialkylaluminum without adversely affecting the process, although the proportionate yields of diborane and trialkylborane are obviously altered thereby. All of the boron halides, i.e. boron trichloride, boron trifluoride, boron tribromide and boron triiodide, may be used.

Since boron halides and dialkylaluminum hydrides are readily susceptable to hydrolysis, it is essential that they be protected from air and moisture to avoid decomposition and coincident loss of product.

For purposes of the invention the order of addition of the reactants is not critical. By adding the boron halide gradually to the dialkylaluminum hydride there is present at all times up to completion of the reaction an excess of dialkylaluminum hydride. This technique avoids undesirable side reactions which tend to interfere with the primary reaction and prevent it from going to completion. Thus, this order of addition is obviously preferred.

To obtain good yields by the method of the invention, it is necessary to contact the boron halides with at least about a stoichiometric quantity of the dialkylaluminum hydride. Considerable excess of dialkylaluminum hydride may be used in the reaction mixture, but it is not particularly desirable because of the unnecessary consumption of the reactant involved. A small excess could be desirable to facilitate product recovery, as will be explained hereafter.

If a solvent is used, the choice of solvent is of particular importance. The solvent selected must be one which does not combine chemically, or does not react with, the primary products or reactants, and in which the by-product aluminum halide formed is substantially insoluble. Among such solvents I have found that the liquid saturated aliphatic hydrocarbons boiling in the range of 25–250° C. are eminently suitable. Such solvents include the pentanes, hexanes, heptanes, cyclohexanes, nonane, decane, dodecane, decalin, and the like. Ethers and aromatic solvents, such as benzenes, xylenes and naphthalenes, are not, as a class, suitable, since they are capable of complexing with the boron halide and the alkylaluminum hydride. The solvent chosen for a particular reaction should be one having a boiling point substantially different from that of the product trialkylborane. The trialkylborane itself could be used as a solvent, but its use entails some disadvantages.

In the preferred embodiment of the invention, the desired quantity of dialkylaluminum hydride is mixed with a solvent and the boron halide is gradually added thereto at a temperature between about 25° C. and the decomposition temperature of the particular dialkylaluminum hydride selected as a reactant. Temperature control is important since the reaction between the boron halide and the dialkylaluminum hydride begins almost immediately. If the reaction is conducted at a temperature below about 25° C., it is difficult to drive to completion, thus the yield of the desired products is lowered. The decomposition temperaure of the alkylaluminum is selected as the upper temperature limit, during the initial stages of the reaction, since it is less stable than any of the other reactants or products. Most of the alkylaluminum compounds are relatively stable at temperatures up to about 150° C. After most of the dialkylaluminum hydride has been consumed to form an intermediate dialkyl boron hydride, the reaction temperature may be raised to 200–250° C. The intermediate dialkyl boron hydride decomposes to form diborane and trialkylborane. Using the solvent system, crystallization and precipitation of the aluminum halide are enhanced at higher temperatures; thus the preferred temperatures of the invention are between 70–200° C.

The time required for admixing the reactants varies with the choice of reactants and temperature and pressure conditions. Generally, the time of addition ranges between about 1–4 hours.

After the reactants are admixed, the mixture is heated at elevated temperatures for a short period of time to insure completion of the reaction. During this time some diborane distills over (if substantially atmospheric pressure is used) and may be collected in an appropriate receiver. To obtain the best possible yields, the diborane should be distilled off as formed using a reaction temperature which is sufficiently high to continuously decompose the intermediate dialkyl boron hydride into diborane and trialkylborane.

Since it is desirable to provide for efficient separation of the aluminum halide by precipitation (which fosters completion of the reaction) by using a solvent system, using this system the heating step is preferably conducted below the melting point of the precipitated aluminum halide. Convenient temperatures are the same as those used during the addition step. Substantial quantities of aluminum halide are generally precipitated from solution shortly before the addition is completed. Substantially complete precipitation, i.e., from 95-98% or more by weight of the aluminum halide formed, occurs during the heating step, with the exception of the case wherein the halide formed is aluminum tribromide. Because of the low melting point of aluminum tribromide (97.5° C.), it is generally necessary to cool the reaction mixture after the reaction is complete to effect substantial precipitation. Precipitation may be facilitated by seeding the reaction mixture with a few crystals of aluminum halide.

The reaction is conveniently conducted at atmospheric pressure, although sub-atmospheric or superatmospheric pressures can be used. A positive pressure of, for example, 5-100 p.s.i., is sometimes helpful, since it raises the possible reaction temperature by raising the boiling points of both the boron trihalide and the particular solvent used.

The reaction is conducted in an inert atmosphere to protect the reactants and products from moisture and oxygen. This is accomplished by purging the equipment used with e.g. nitrogen gas, and maintaining a blanket of the gas over the reaction mixture. Other inert gases such as argon, helium, or even hydrogen and the like are also suitable for this purpose.

After the reaction is complete, the reaction mixture is cooled and filtered to remove the crystallized aluminum halide. Generally, about 95-99% by weight of the aluminum halide formed is removed in this manner. After removal of the aluminum halide, the filtrate comprises the solvent, the products trialkylborane and diborane, and some intermediate dialkylborane hydride, which is converted to the desired products by further heating. The filtrate also contains a small percentage of residual aluminum halide. Diborane and trialkylborane are recovered from the filtrate (or from the reaction mixture if no solvent is used) by a simple distillation.

As I have noted, it is sometimes difficult, particularly when aluminum trichloride and aluminum tribromide are formed in the reaction mixture, to separate the last traces of halide ion from the trialkylborane. After the separation of the bulk of the halide and the boron hydrides, the filtrate (or distillate) may be washed with oxygen-free water, which preferably contains a small amount of HCl. The treated solution is neutralized with caustic and the trialkylborane is recovered therefrom by distillation. The problem of residual halide removal may also be overcome by adding to the filtrate or distillate a reagent that is capable of complexing or reacting with the halide without otherwise interfering with the products. Tertiary amines and aluminum trialkyls are quite suitable for this purpose. A small excess of dialkylaluminum hydride, particularly if it is added after the bulk of the halide has precipitated, also works well.

Using my novel method, both trialkylborane and diborane can be obtained in good yields. One of the outstanding advantages of my process is that substantially pure aluminum halide is recovered as a by-product in yields of about 85-95% or more of theory, thus providing an additional method by which these valuable products can be obtained.

The reaction is conducted in an agitated reactor equipped with a temperature measuring device, an inlet tube and a venter reflux condenser. The apparatus is so arranged that an inert atmosphere is maintained to protect the products from air oxidation and moisture. If superatmospheric pressure is to be used, the autoclave should be equipped with a pressure condenser.

My invention is further illustrated by the following examples.

*Example I*

A nitrogen-swept flask (equipped with gas inlet tubes, thermometer, stirrer, and reflux condenser topped with a tube leading first to a Dry Ice-cooled trap, then a liquid nitrogen-cooled trap) was charged with 188 g. of freshly prepared diisobutylaluminum hydride and 162 g. of heptane in a nitrogen atmosphere. Boron trichloride, 160 g., was added over a period of 1.5 hours. A cooling bath was needed to hold the reaction temperature at 70-80° C. after the first 15 minutes of addition. $AlCl_3$ formed as a precipitate after two-thirds of the $BCl_3$ had been added. On completion of the $BCl_3$ addition, the mixture was brought to reflux (111° C.) in 30 minutes and held there for 30 minutes. During this time, some diborane was caught in the liquid nitrogen-cooled trap; it was identified by its boiling point (−90° C.), pyrophoricity, and hydrolysis to $H_2$ and $H_3BO_3$. The cooled reaction mixture was pressure filtered; the washed cake was a quantitative yield of off-white granular $AlCl_3$ (180 g.). By fractional distillation through a Vigreux column into traps at −75 and −190° C., heptane was removed at 10 mm. pressure (in dry $N_2$) and a still-pot temperature of up to 91° C. During this operation 2.5 g. of diborane was trapped at −190° C., and 0.5 g. remained with solvent and higher boranes in the −75° C. trap. The diisobutylboron hydride remaining in the still-pot was converted, on attempted distillation, to the more volatile triisobutylborane (B.P. 80° C. at 20 mm. of Hg) and diborane (B.P. −92.5° C.), both of which were trapped and characterized.

*Example II*

A 1 liter flask, equipped with a therometer, agitator, feed funnel, a reflux condenser vented to a Dry Ice-cooled condenser and two liquid nitrogen-cooled condensers, was purged of air with nitrogen. To the flask was charged 339 g. (1.35 moles) of boron tribromide. Over a period of 3.5 hours, 125 g. of diethylaluminum hydride (containing 27.7% by weight of triethylaluminum) was fed to the boron tribromide under a blanket of nitrogen. During the course of the addition the temperature was permitted to rise from 25 to 103° C. The reaction mass was then heated at reflux, 118.5° C., for an additional 3.5 hours. Over a period of 4 hours, 83 g. of triethylborane was slowly distilled from the reaction mass into a receiver. The more volatile boron compounds were collected in the Dry-Ice and liquid nitrogen-cooled condensers. The final reaction mass temperature was 209° C. The reaction residue, which crystallized on cooling, was essentially pure aluminum bromide. Approximately 2 g. of material that had collected in the liquid nitrogen-cooled condensers was vaporized. The vapor was shown to be primarily diborane by mass spectrograph analysis. The Dry-Ice cooled condenser contained 4 g. of liquid comprising (according to mass spectrograph analysis) diborane, higher boron hydrides and alkylboranes.

I claim:

1. Method of simultaneously preparing diborane and trialkylboranes comprising admixing in an inert atmosphere a boron halide and a dialkylaluminum hydride at a temperature below the decomposition temperature of said hydride, heating the reaction mixture at an elevated temperature up to about 250° C., and recovering diborane and a trialkylborane from said reaction mixture.

2. Method of simultaneously preparing diborane and trialkylboranes comprising adding in an inert atmosphere a boron halide to a dialkylaluminum hydride in the presence of an inert saturated hydrocarbon solvent at a temperature of at least about 25° C. and below the decomposition temperature of said hydride, heating the reaction mixture after the addition of said halide is complete at an elevated temperature to effect precipitation of a substantial quantity of said aluminum halide, separating said aluminum halide by filtration, and recovering diborane and a trialkylborane from the reaction mixture.

3. Method of simultaneously preparing diborane and trialkylboranes comprising gradually adding in an inert atmosphere a boron halide to a dialkylaluminum in the presence of an inert saturated hydrocarbon solvent at a temperature of at least about 25° C. and below the decomposition temperature of said hydride, heating the reaction mixture after the addition of said halide is complete at a temperature between about 50–250° C., cooling the reaction mixture to effect precipitation of about 95–99% of said aluminum halide, separating said aluminum halide by filtration, and recovering diborane and a trialkylborane from the reaction mixture.

4. Method of simultaneously preparing diborane and trialkylboranes comprising gradually adding in an inert atmosphere a boron halide to a dialkylaluminum hydride in the presence of an inert saturated hydrocarbon solvent at a temperature of at least about 25° C. and below the decomposition temperature of said hydride, heating the reaction mixture after the addition of said halide is complete at a temperature between about 50–250° C. and simultaneously vaporizing diborane from the reaction mixture, cooling the reaction mixture, separating aluminum halide formed during the reaction by filtration, and recovering diborane and a trialkylborane from the filtrate.

5. Method according to claim 4 wherein said boron halide is boron trichloride.

6. Method according to claim 4 wherein said boron halide is boron tribromide.

7. Method according to claim 4 wherein an excess of the stoichiometric requirement of said dialkylaluminum hydride is used.

8. Method of simultaneously preparing diborane and trialkylboranes comprising gradually admixing in an inert atmosphere substantially stoichiometric quantities of a boron halide and a dialkylaluminum hydride in the presence of an inert saturated hydrocarbon solvent, heating the reaction mixture after the addition of said halide is complete at an elevated temperature between 50–250° C. and simultaneously vaporizing diborane from the reaction mixture, separating the aluminum halide formed during the reaction, and recovering diborane and a trialkylborane from the residue by distillation.

9. Method according to claim 8 wherein said hydride is diethylaluminum hydride.

10. Method according to claim 8 wherein said hydride is diisobutylaluminum hydride.

11. Method according to claim 8 wherein said hydride is di-n-propylaluminum hydride.

12. The method of manufacturing boron compounds represented by the formula $B_2R_{6-2n}H_{2n}$, wherein R is alkyl and $n$ may vary from 1 to 3, comprising the reaction in an inert solvent-diluent under substantially anhydrous conditions of an alkylaluminum hydride and a boron compound represented by the formula $BX_3$, wherein X is a halide radical, and then recovering said boron compounds from the reaction products.

References Cited by the Examiner
FOREIGN PATENTS
1,028,100  4/58  Germany.
1,035,628  8/58  Germany.

OTHER REFERENCES
Goribeau: "F.I.A.T. Review of German Science, Inorganic Chemistry," Part I, pages 224, 226–228 (1948).

MAURICE A. BRINDISI, *Primary Examiner.*